United States Patent [19]

Ikegaya et al.

[11] Patent Number: 4,802,084
[45] Date of Patent: Jan. 31, 1989

[54] ADDRESS TRANSLATOR

[75] Inventors: Hiroshi Ikegaya, Yokohama; Hidenori Umeno, Kanagawa; Takashige Kubo, Hachioji; Yoshio Ukai, Yokohama; Nobuyoshi Sugama, Chigasaki, all of Japan

[73] Assignee: Hitachi, Ltd., Tokyo, Japan

[21] Appl. No.: 827,545

[22] Filed: Feb. 10, 1986

[30] Foreign Application Priority Data

Mar. 11, 1985 [JP] Japan .................................. 60-46549

[51] Int. Cl.⁴ .............................................. G06F 12/06
[52] U.S. Cl. ................................................ 364/200
[58] Field of Search ... 364/200 MS File, 900 MS File

[56] References Cited

U.S. PATENT DOCUMENTS

| | | | |
|---|---|---|---|
| 4,096,573 | 6/1978 | Heller et al. | 364/200 |
| 4,355,355 | 10/1982 | Butwell et al. | 364/200 |
| 4,456,954 | 6/1984 | Bullions, III et al. | 364/200 |
| 4,459,661 | 7/1984 | Kaneda et al. | 364/200 |
| 4,521,846 | 6/1985 | Scalzi et al. | 364/200 |
| 4,564,903 | 1/1986 | Guyette et al. | 364/300 |
| 4,589,092 | 5/1986 | Matick | 364/900 |
| 4,597,044 | 6/1986 | Circello | 364/200 |
| 4,612,612 | 9/1986 | Woffinden et al. | 364/200 |
| 4,649,479 | 3/1987 | Advani et al. | 364/300 |
| 4,660,144 | 4/1987 | Walsh | 364/200 |
| 4,674,038 | 6/1987 | Brelsford et al. | 364/200 |
| 4,695,950 | 9/1987 | Brandt et al. | 364/200 |

FOREIGN PATENT DOCUMENTS 113182 1/1980 Japan .

Primary Examiner—Gary V. Harkcom
Assistant Examiner—Randy W. Lacasse
Attorney, Agent, or Firm—Antonelli, Terry & Wands

[57] ABSTRACT

In order to carry out address translation which can reduce an overhead of the VMCP to support a virtual storage, a flag indicating a common segment in the virtual machine and a system identifier are held in a TLB, and a VM identifier is held in a segment table origin stack. For the common segment, a current VM identifier is compared with the VM identifier in the segment table origin stack to determine validity of a TLB entry, and for a non-common segment, a system identifier read from the segment table origin stack is compared with the system identifier in the TLB entry to determine validity of the TLB entry.

3 Claims, 4 Drawing Sheets

ADDRESS TRANSLATOR

BACKGROUND OF THE INVENTION

The present invention relates to a virtual machine system having a TLB (Translation Lookaside Buffer), and more particularly to an address Translator for such system.

The virtual machine system is a computer system which operates as if there were a plurality of computers under resources (processor, real storage, channel and I/O devices) of one real machine. In the virtual machine system (hereinafter VMS), a number of operating systems (OS's) can apparently simultaneously run on one real machine so that all resources including the main storage and the I/O devices as well as the processor are shared by the OS's. To this end, two operation modes, a privileged mode and a non-privileged mode in the real machine are utilized. Normally, the privileged mode is used for the OS operation mode, but in the VMS, the privileged mode is used as a special control program (which is referred to as a virtual machine control program (VMCP)) operation mode to operate the OS in the non-privileged mode. The plurality of virtual machines (hereinafter VM's) are simulated by the VMCP so that they are functionally equivalent to the real machine.

FIG. 2 shows a relationship between the address space and the address translation table when the OS executed on the VM adopts the virtual storage control.

In FIG. 2, when the OS executes a program on the virtual storage which the OS prepared, it translates the address by using a translation table which the OS controls to execute the program. However, where the OS is executed on the VM, the address which the OS on the VM translated is a virtual address when it is viewed from the VMCP and it is necessary for the VMCP to translate that address to an address on the real storage for execution. When the OS which carries out the virtual storage control is to be executed on the VM, a two-step address translation is necessary. The VMCP reduces the overhead therefor by use of a shadow table to improve the processing efficiency. The VMCP manages a table for translating the address on the virtual storage prepared by the OS directly to the address on the real storage. If either one of those two tables is modified, it must be reflected in the shadow table. The VMCP carries out this processing.

As disclosed in Japanese Unexamined Patent Publication No. 55-113182, in order to reduce the overhead of the VMCP to support the OS virtual storage, a segment table origin stack for realizing a multiple virtual storage system is provided, and a portion of segment table origin addresses for the OS or VMCP, space identifiers to constitute the multiple virtual storage and segment identifiers to identify the VM's are held in an entry of the stack, and a TLB is constructed to hold the space/segment identifiers read from the segment table origin stack as the segment identifiers. When the TLB is read, the corresponding space/segment identifier is compared with the space/segment identifier in the TLB entry to determine validity of the read-out TLB entry.

In this method, however, the necessary TLB entry may be invalidated because a common segment in the virtual machine cannot be determined.

SUMMARY OF THE INVENTION

It is an object of the present invention to provide an address translator which reduces the overhead necessary to support an OS virtual storage by identifying a common segment in the OS by using a TLB in a virtual machine system.

In the address translator of the present invention, a flag for indicating the common segment in the virtual machine and a system identifier are held in the TLB, and a VM identifier is held in a segment table origin stack. For the common segment, a current VM identifier and the VM identifier of the segment table origin stack are compared to determine the validity of the TLB entry, and for a non-common segment, the system identifier read from the segment table origin stack and the system identifier in the TLB entry are compared to determine the validity of the TLB entry.

DESCRIPTION OF THE PREFERRED EMBODIMENTS

In order to facilitate the understanding of the present invention, a virtual machine system to which the present invention is applied is explained with reference to FIG. 1.

Figure 1:
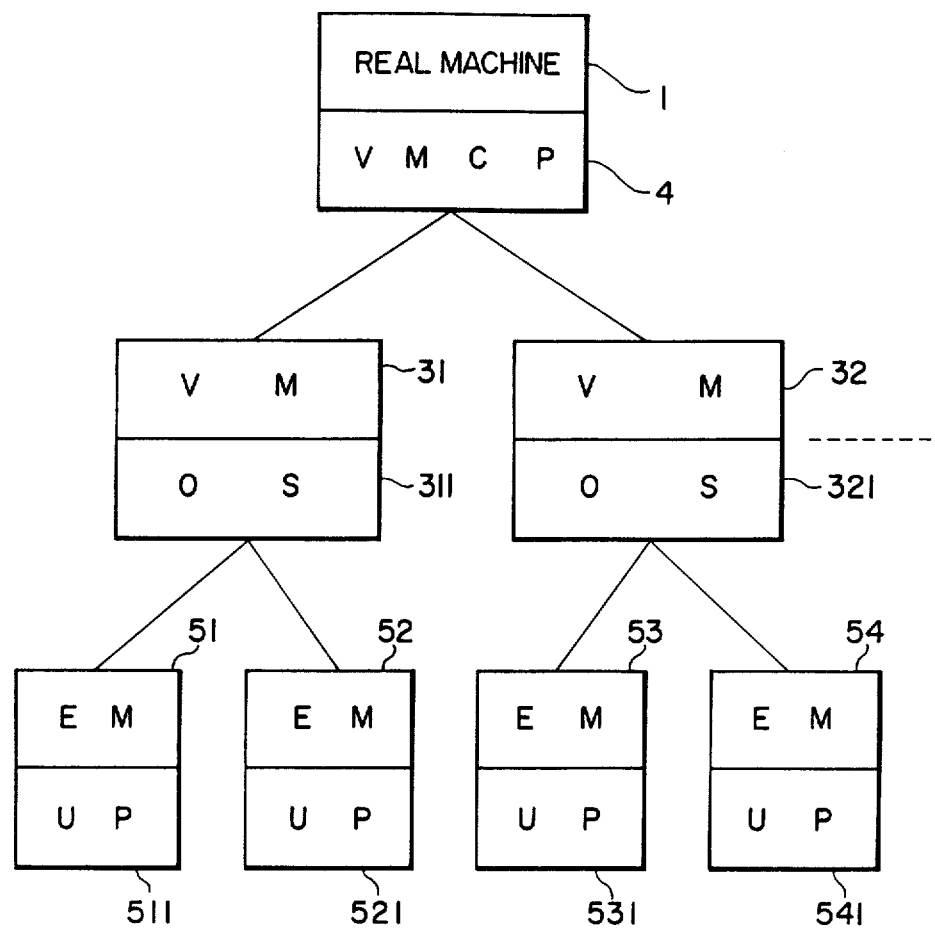
FIG. 1 is a conceptual chart of a conventional virtual machine system.
Figure 2:
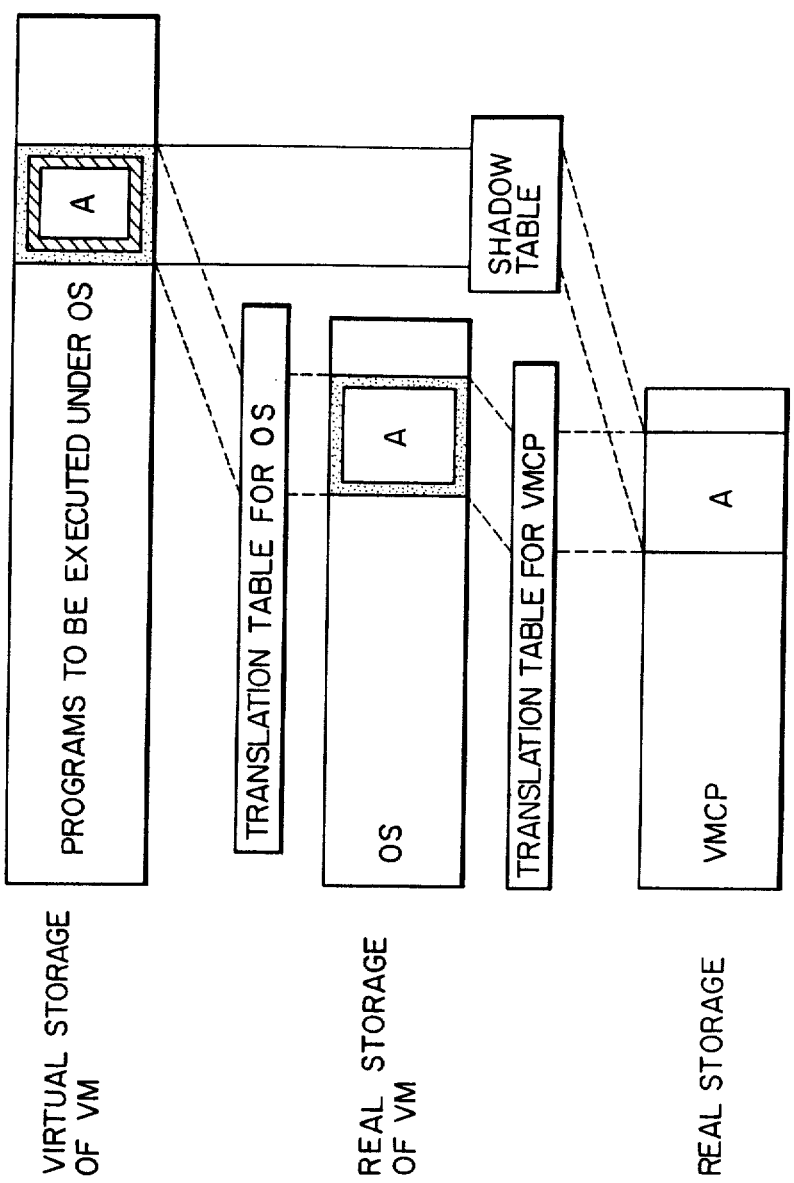
FIG. 2 shows a relationship between an address space and an address translation table in a VMS.

FIG. 1 shows a conceptual view of a conventional VMS. When a real machine 1 imparts a real machine interface capable of handling a processing request (machine instruction) in a privileged mode or non-privileged mode to a VMCP 4, the VMCP 4 responds thereto to impart other real machine interfaces to OS 311 and OS 321 of VM 31 and VM 32 to enable them. While only two VM's are shown in FIG. 1, the operation is the same when more than two VM's are included. The OS 311 and OS 321 operate by way of the real machine interfaces imparted by the VM 31 and VM 32 so that they appear as if they had operated on the real machine 1. The OS 311 and OS 321 impart extended machine interfaces to user programs 511, 521, 531 and 541. Extended machines 51, 52, 53 and 54 are functions to execute processings for functional processing requests (supervisor calls) from the user programs, in the OS's for each OS, and machine instructions of the non-privileged mode. The relation between the VMCP 4 and the VM's 31 and 32 is similar to a relationship between a control program and a processing program in the conventional OS. The VMCP 4 corresponds to the control program and the VM's 31 and 32 correspond to the processing program. Since the VM's 31 and 32 generated by the VMCP 4 is executed in the non-privileged mode, the privilege instructions on the VM's 31 and 32 are reported to the VMCP 4 as privileged instruction exceptions and they are executed by the simulation by the VMCP 4.

Figure 3:
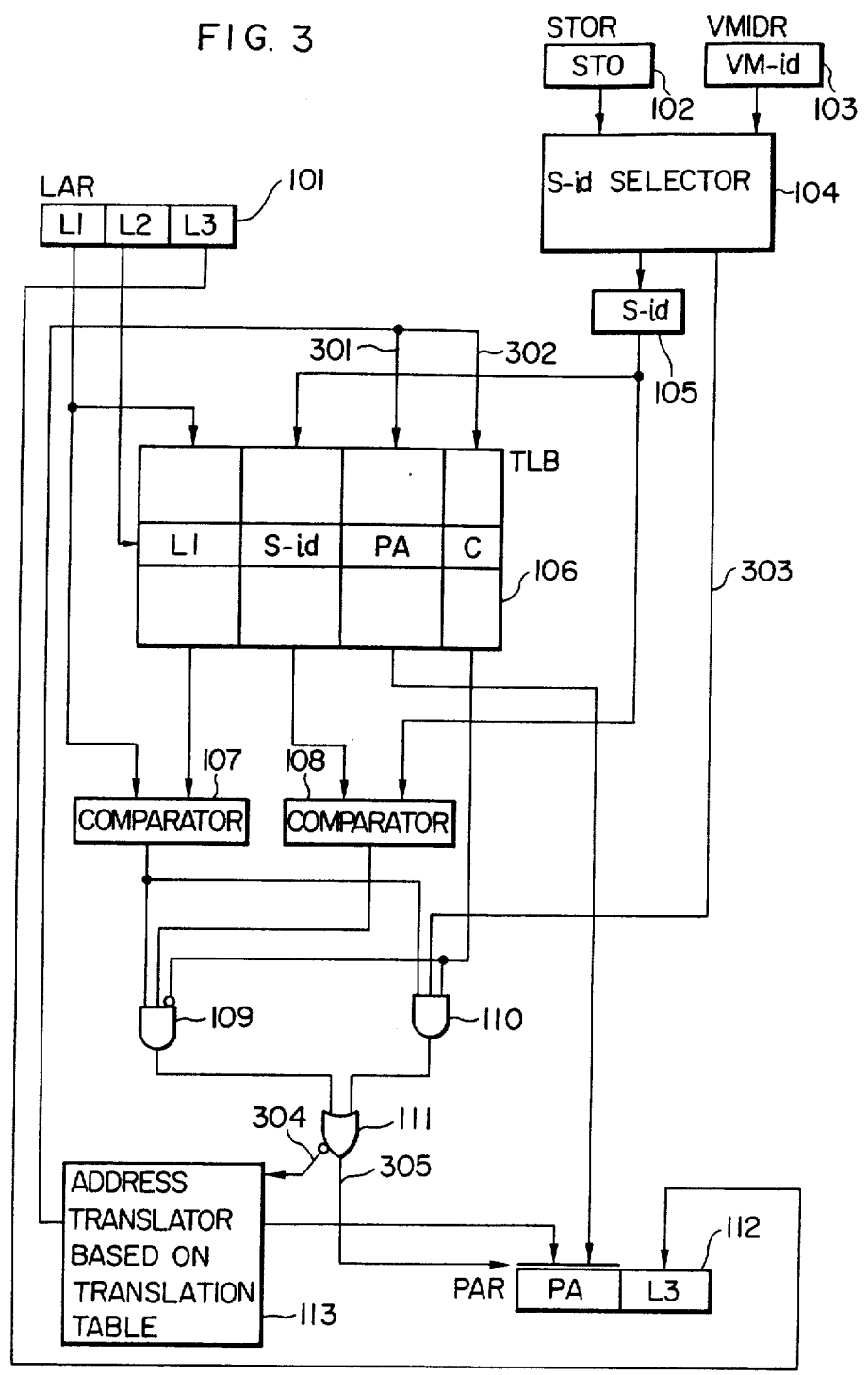
FIG. 3 shows a configuration of one embodiment of the present invention.

An apparatus shown in FIG. 3 comprises a logical address register (LAR) 101, a segment table origin address register (STOR) 102, a VM identifier register (VMIDR) 103, an S-id selector 104, a system identifier register 105, a translation lookaside buffer (TLB) 106, comparators 107 and 108, AND gates 109 and 110, an OR gate 111, a physical address register (PAR) 112 and an address translator 113.

The address on the virtual storage is set in the LAR 101, the segment origin address (STO) of the OS or the VMCP is set in the STOR 102, and the VM identifier (VM-id) is set in the VMIDR 103. The system identifier (S-id) read from the S-id selector 104 is set in the system identifier register 105. The L1 portion of the LAR 101 is stored in the L1 field of the TLB 106, and the content of the system identifier register 105 is stored in the S-id field of the TLB 106. The physical address translated by the address translator 113 is stored in the PA field through a data line 301, and the value "1" is stored in the C field through a data line 302 when the address translated by the address translator 113 is the common segment, and the value "0" is stored through the data line 302 when the address is the non-common segment.

The apparatus of FIG. 3 operates as follows. The entry of the TLB 106 is designated by the L2 portion of the logical address set in the LAR 101. The L1 portion of the LAR 101 is compared with the L1 field of the TLB 106 by the comparator 107 which produces an output value "1" when both are equal. The content of the system identifier register 105 is compared with the system identifier stored in the S-id field of the TLB 106 by the comparator 108 which produces an output value "1" when both are equal. The VM-id of the VMIDR 103 is compared with the VM-id stored in the STO stack by the S-id selector 104 which produces a "1" output through a signal line 303 when both are equal.

When the output value of the comparator 107 and the output value of the comparator 108 are "1" and the C field of the TLB 106 is value "0", that is, when the system identifiers are equal and the C field of the TLB 105 indicates the non-common segment, the AND gate 109 produces an output value "1". When the output value of the comparator 107 and the output value on the signal line 303 are "1" and the C field of the TLB 106 is value "1", that is, when the VM-id's are equal and the C field of the TLB 106 indicates the common segment, the AND gate 110 produces an output value "1". When either one of the output values of the AND gates 109 and 110 are "1", the OR gate 111 produces an output value "1" through a signal line 305. When the signal line 305 is value "1", the PA field of the TLB 106 is set in the PAR 112. This means that the address translation by the TLB has succeeded. When both outputs of the AND gates 109 and 110 are value "0", the OR gate 111 produces an output value "1" through a signal line 304. When the signal line 304 is value "1", the physical address from the address translator 113 is set in the PAR 112.

Figure 4:
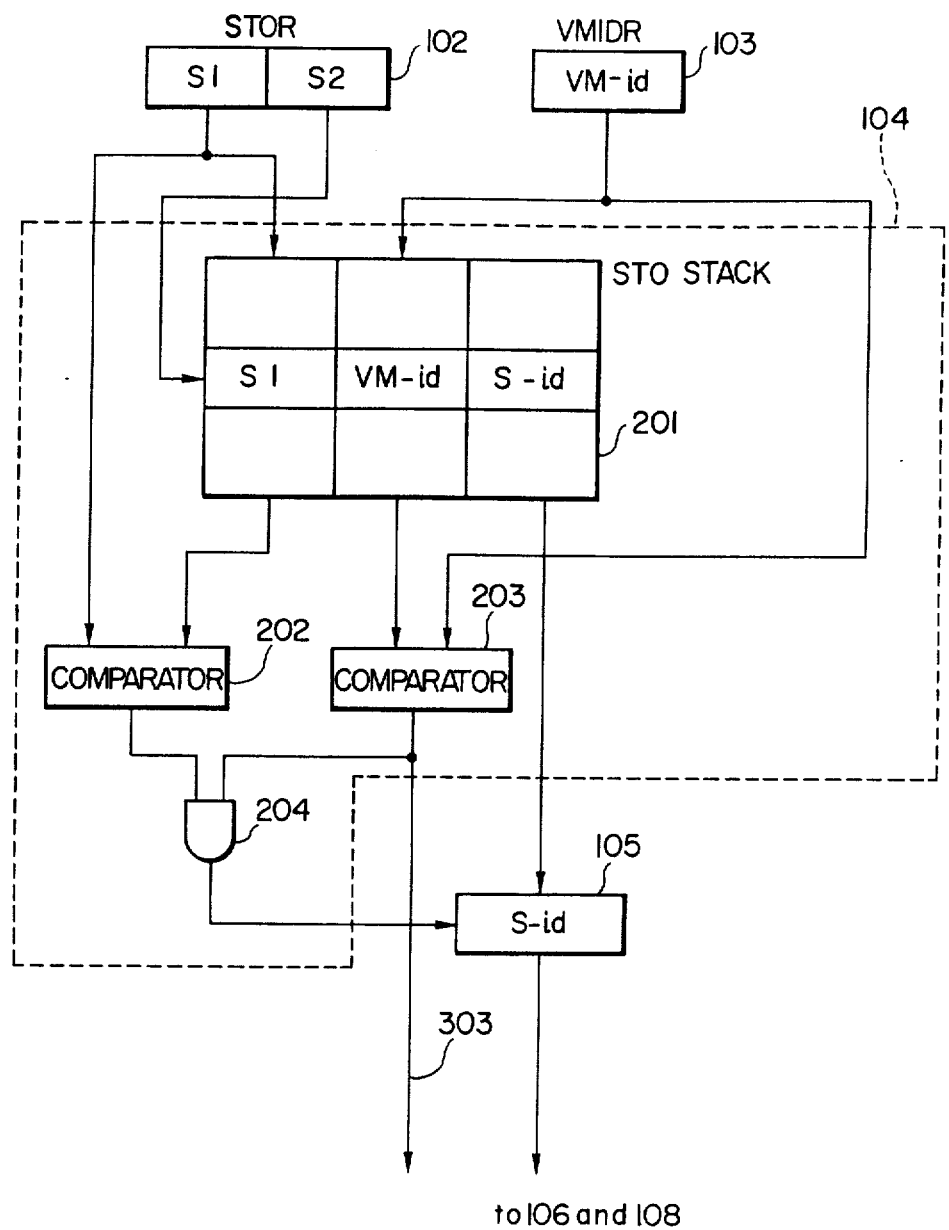
FIG. 4 shows one embodiment of an S-id selector of FIG. 3.

FIG. 4 shows an embodiment of the S-id selector 104 of FIG. 3. The selector of FIG. 4 operates as follows. The entry of the STO stack 201 is designated by the S2 portion of the segment table origin address set in the STOR 102. The S1 portion of the STOR 102 is compared with the S1 portion of the STO stack 201 by the comparator 202 which produces an output value "1" when both are equal. The VM-id of the VMIDR 103 is compared with the VM-id field of the STO stack 201 by the comparator 203 which produces an output value "1" through a signal line 303 when both are equal. When the output value of the comparator 202 and the output value of the comparator 203 are both "1", the output value of the AND gate 204 is "1". When the output value of the AND gate 204 is "1", the S-id field of the corresponding entry of the STO stack 201 is enabled and the value of S-id field is set in the system identifier register 105.

In accordance with the present embodiment, the common segment can be identified by using the TLB.

In accordance with the present invention, the flag which indicates the common segment is held in the TLB, and the VM identifier and the system identifier are held in the segent table origin stack so that the common segment can be identified by using the TLB. Accordingly, the overhead to support the virtual storage function of the OS can be reduced and the performance of the VMS can be improved.

We claim:

1. An address translator for translating a virtual address into a corresponding physical address for use in a virtual machine system having a control program for simultaneously operating plural virtual machines with respective operating systems on one real machine, each of said operating systems holding a first identifier for identifying a virtual machine on which the operating system runs, comprising:

a segment table origin stack for storing therein identification entries each containing a portion of a segment table origin address for a virtual address, a first identifier and a second identifier representative of a combination of said segment table origin address for a virtual address and said first identifier;

a first comparator for comparing a first identifier for a virtual machine on which a current operation is running with each of said first identifiers stored in said segment table origin stack;

a second comparator for comparing a portion of a segment table origin address for a virtual address specified by said running program with each of the portions of segment table origin addresses for virtual address stored in said segment table origin stack;

an AND gate coupled to receive the outputs of said first and second comparators;

an address translation buffer for storing therein address translation entries each containing a portion of a virtual address, a physical address corresponding to the virtual address, a second identifier and a flag indicative of whether or not said virtual address belongs to a common segment in a virtual machine;

a third comparator for comparing a second identifier read out, in response to the output of said AND gate, from said segment table origin stack in association with the portion of a segment table origin address for said virtual address specified by said running program with each of said second identifiers stored in said address translation buffer; and selection means coupled to the outputs of said first and third comparators and responsive to said flag in said address translation buffer for delivering the output of said first comparator when said flag indicates that said virtual address specified by said running program belongs to a common segment and for delivering the output of said third comparator when said flag indicates that said virtual address specified by said running program does not belong to a common segment, whereby that one of said physical addresses stored in said address translation buffer which corresponds to the virtual address specified by said running program is delivered in response to the output of said selection means.

2. An address translator according to claim 1, in which said selection means includes a second AND gate coupled to receive the output of said first comparator and a flag signal representative of said flag read out from said address translation buffer, a third AND gate coupled to receive the output of said third comparator and said flag signal, and an OR gate coupled to receive the outputs of said second and third AND gates for generating a signal as said output signal of said selection means.

3. An address translator according to claim 2, further comprising a fourth comparator for comparing a portion of said virtual address specified by said running program with each of the portions of said virtual addresses stored in said address translation buffer, the output of said fourth comparator being coupled to said second and third AND gates.

* * * * *